(12) United States Patent
Gyland

(10) Patent No.: US 8,125,208 B2
(45) Date of Patent: Feb. 28, 2012

(54) TRANSFORMER DEVICE UTILIZING AN AIR GAP FOR NON-CONTACT ENERGY TRANSMISSION FROM THE PRIMARY SIDE TO THE SECONDARY SIDE

(76) Inventor: Geir Olav Gyland, Gyland (NO)

( * ) Notice: Subject to any disclaimer, the term of this patent is extended or adjusted under 35 U.S.C. 154(b) by 439 days.

(21) Appl. No.: 11/568,496

(22) PCT Filed: Apr. 29, 2005

(86) PCT No.: PCT/NO2005/000140
§ 371 (c)(1),
(2), (4) Date: Jul. 16, 2007

(87) PCT Pub. No.: WO2005/106902
PCT Pub. Date: Nov. 10, 2005

(65) Prior Publication Data
US 2007/0267918 A1    Nov. 22, 2007

(30) Foreign Application Priority Data
Apr. 30, 2004    (NO) .................................. 20041775

(51) Int. Cl.
*H01F 27/28* (2006.01)
(52) U.S. Cl. .............................. 323/362; 363/97; 363/16
(58) Field of Classification Search .............. 363/21.02, 363/97, 16, 21.01, 21.03, 89; 323/362, 355
See application file for complete search history.

(56) References Cited

U.S. PATENT DOCUMENTS

| | | | |
|---|---|---|---|
| 4,996,638 A * | 2/1991 | Orr .............................. | 363/21.15 |
| 5,341,083 A * | 8/1994 | Klontz et al. .................. | 320/109 |
| 5,608,771 A * | 3/1997 | Steigerwald et al. ........... | 378/15 |
| 5,654,621 A * | 8/1997 | Seelig .......................... | 320/108 |
| 6,301,128 B1 * | 10/2001 | Jang et al. ...................... | 363/17 |
| 6,418,038 B2 * | 7/2002 | Takahama et al. .............. | 363/17 |
| 2001/0008552 A1 * | 7/2001 | Harada et al. .................. | 378/107 |
| 2002/0057584 A1 * | 5/2002 | Brockmann .................... | 363/98 |
| 2003/0151930 A1 * | 8/2003 | Berghegger ............... | 363/21.02 |
| 2003/0155901 A1 * | 8/2003 | Yasumura ..................... | 323/323 |
| 2003/0198062 A1 * | 10/2003 | Yasumura ....................... | 363/16 |

FOREIGN PATENT DOCUMENTS

| | | |
|---|---|---|
| JP | 6327257 | 11/1994 |
| JP | 11146645 | 5/1999 |
| JP | 2001119943 | 4/2001 |
| JP | 2002262568 | 9/2002 |
| WO | 03/098773 A1 | 11/2003 |

* cited by examiner

*Primary Examiner* — Harry Behm
(74) *Attorney, Agent, or Firm* — Akerman Senterfitt

(57) ABSTRACT

A device and method for non-contact transmission of electrical energy by means of a transformer (1) comprising at least a primary side (2) and at least a secondary side (8), and where resonance is set up in a circuit comprising the primary winding (4) of the transformer (1) and a capacitor (14) connected in series with the primary winding (4).

6 Claims, 6 Drawing Sheets

TRANSFORMER DEVICE UTILIZING AN AIR GAP FOR NON-CONTACT ENERGY TRANSMISSION FROM THE PRIMARY SIDE TO THE SECONDARY SIDE

This invention regards a device for non-contact energy transmission. More particularly, it regards the transmission of electric energy without metallic contact by means of magnetic induction, and where the leakage induction of a transformer is included in a resonant circuit as an essential element for the energy transmission. The invention also regards a method of implementing the invention.

Prior art non-contact transmission of electrical energy between bodies is based on e.g. other types of inductive transmissions and electromagnetic radiation.

The principal disadvantage of these previously known devices for non-contact energy transmission is that they exhibit a relatively low efficiency, especially when the distance between the bodies between which the energy transmission is required, is relatively long. The relatively low efficiency that is characteristic of devices according to prior art may result in undesirable overheating or undesirable transmission of energy to the surroundings.

It is also known to use a transformer having a dual core for non-contact energy transmission. In such a transformer the primary and secondary windings of the transformer are arranged on separate halves of the core. In practical embodiments of this type of transformer there is rarely more than a millimeter's gap between the core halves. Using a bigger gap causes a significant increase in leakage inductance; the transformer loss will increase and the occurrence of electromagnetic interference (EMI) will be significant.

Ideally a transformer will not store energy but will transfer all energy instantaneously from input to output. However, in practical embodiments some energy is stored in the transformer.

Leakage inductance causes energy to be stored in the non-magnetic area between the windings of the transformer and the poles of the core halves. Leakage inductance is caused by a poor flux connection and is normally undesirable. Mutual inductance causes energy to be stored in the transformer core and in the gap between two core halves.

Thus leakage inductance, such as it appears in prior art devices, contributes to a poorer efficiency, imposes limitations on transfer distance and causes unwanted radiation (EMI).

The object of the invention is to remedy or reduce at least one of the disadvantages of prior art.

The object is achieved in accordance with the invention, by the characteristics stated in the description below and in the following claims.

According to the invention a series resonance is set up between primarily the leakage inductance and a series capacitance on the input to the primary winding of a divided transformer. The input is delivered at a frequency suitable for the series resonance circuit.

The leakage induction is an essential part of the invention, and hence there is no attempt to minimise it, but rather to optimise its value.

Experiments show that even when there is a substantial distance between the core parts of the transformer, it is possible to achieve surprising improvements in efficiency compared with prior art energy transmissions. It is also surprising that, within a finite range of distances between the core halves of the transformer, the effect of a change in distance, on efficiency, is negligible.

Advantageously the input frequency to the resonant circuit is adjusted during operation in order to ensure optimal energy transfer, all because of variations in components, changes in the gap between the core halves of the transformer, changes in input voltage, plus load changes. Thus it is advantageous for the device to have a feedback loop from the output.

The frequency is adjusted from a high frequency down towards the frequency of resonance. The adjustment from a higher frequency down towards the frequency of resonance is necessary in order to achieve a high efficiency and a relatively low EMI. The reason for this is, among other things, that energy is delivered to the sine curve of the resonant circuit before it has reached the maximum voltage if the frequency is higher than the frequency of resonance. If the frequency is lower than the frequency of resonance the energy will be delivered to the sine curve with the opposite polarity of the voltage change (AU), whereby the efficiency is reduced.

The invention will be explained in greater detail in the specific part of the specification.

The efficiency of the energy transfer is influenced by various factors. If a near-resistive load is reduced (lower resistance) the so-called Q-value of the leakage inductance will increase, whereby the efficiency increases. The reason for this is that the leakage inductance L2-M on the secondary side of the transformer ends up in series with the resistive load, and these are parallel to the mutual induction M. This means that if the resistance is reduced the Q-value of the leakage inductance will increase, in turn leading to an increased Q-value for the whole resonant circuit.

The Q-value of a coil or a series resonance circuit is defined as:

$$Q = \frac{\omega \cdot L}{R}$$

where $\omega$ is the frequency, L is the inductance of the transformer and R is the ohmic resistance of the winding wires in the transformer at frequency $\omega$.

Thus a tenfold change in a near-resistive load does not represent a significant change in the frequency of resonance of the inductive coupling.

A load that partly results in these properties is produced if the load is connected up after the output signal from the transformer has been rectified and filtered with a high capacitance that does not affect the frequency of resonance.

The primary side of the transformer generates the most heat. The losses include losses in the winding wire, losses due to the absorption of noise and losses that are caused by having a greater field in the core.

Increasing the Q-value of the resonance element will cause a reduction in the current in the winding because the voltage across the winding increases. This means that the wire is diameter may be reduced.

Preferably the inductance on the primary and secondary sides of the transformer is as high as possible. The upper limit for the inductance is determined by the optimum leakage inductance, the number of turns that the core can accommodate and the loss caused by ohmic resistance in the winding wire.

A reduced capacitance will increase the Q-value of the resonant circuit. The voltage into the transformer increases, whereby the current decreases. It is the current level that causes saturation in the core. If the capacitance value is small the impedance |Z| of the series resonance circuit at the frequency in question will be high. This means that the maximum transferable power will be reduced. The impedance of a series resonance circuit |Z1 is defined as $$|Z1| = \sqrt{R^2 + \left(\omega L - \frac{1}{\omega C}\right)^2}$$

where ω is the frequency, L is the inductance of the transformer, C is the capacitance and R is the ohmic resistance of the winding wire in the transformer at frequency ω.

The formula applies to a series resonant circuit, while in this invention the inductance L will represent the equivalent seen from the primary side of the transformer. The load will also be included in this equivalent. The formula outlines the principle of the impedance of the circuit as a function of the frequency. When the units are not connected or the load is small, the frequency will be high. Upon an increase in load (reduction in the impedance) the frequency will decrease towards the frequency of resonance of the circuit. How near the frequency of resonance depends on the load, but the frequency will never be equal to or lower than the frequency of resonance.

The high Q-value of the resonant circuit results in considerably less current in the primary winding when compared with prior art for energy transmission. When the core of the secondary winding, the secondary core, is at a relatively large (20% to 50%) distance (air gap) from the primary core relative to the distance between the poles of the primary core, the field extending through the secondary core is reduced. The field on the primary side must then be increased in order to maintain the voltage on the secondary side at the desired level.

When a near-resonance frequency is impressed on the resonant circuit the voltage across the primary winding will increase greatly and the current will drop. The current in the primary core must be minimised in order to achieve the highest possible efficiency. A higher current will cause a greater magnetic flux density (B), leading to a greater loss in the core and also a greater loss in the windings.

The device and the method according to the invention are also suitable for signal transmission.

The following describes a non-limiting example of a preferred embodiment and method illustrated in the accompanying drawings, in which.

Figure 1:
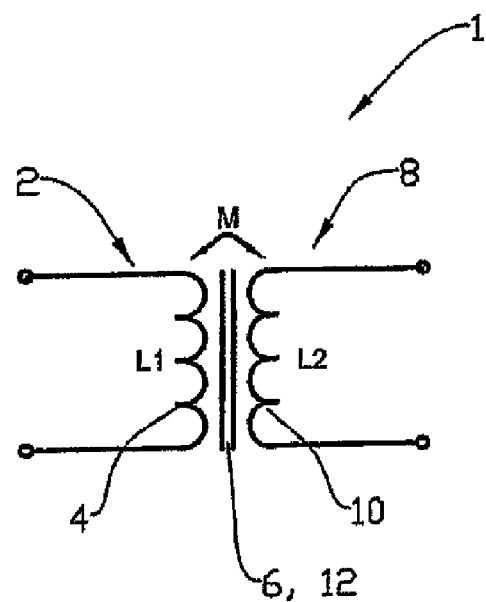
FIG. 1 shows a connection diagram for a transformer according to prior art.

To make it easier to illustrate the principle of operation of the invention, designations regarding a transformer of a design that is known per se will first be explained with reference to FIGS. 1 and 2. The transformer is denoted by reference number 1. The transformer 1 comprises a primary side 2 that includes a primary winding 4 and a primary core 6, and a secondary side 8 that includes a secondary winding 10 and a secondary core 12.

In FIG. 1 L1 denotes the inductance of the primary side 2 of the transformer 1, while L2 is the inductance on the secondary side 8. M denotes mutual inductance of the transformer 1.

Figure 2:
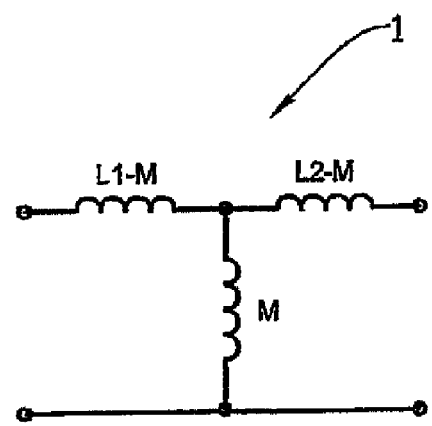
FIG. 2 shows the T-equivalent of the transformer in FIG. 1.

The T-equivalent of the transformer 1 is shown in FIG. 2, where L1-M represents the leakage inductance on the primary side 2 and L2-M represents the leakage inductance on the secondary side 8.

As mentioned in the general part of the specification, leakage inductance represents the energy that is stored in the non-magnetic area between the primary windings 4 and secondary windings 10 of the transformer 1, while the mutual inductance represents the energy that is stored in the cores 6, 12 and in the gap between the primary 6 and secondary 12 cores of the transformer 1.

Figure 3:
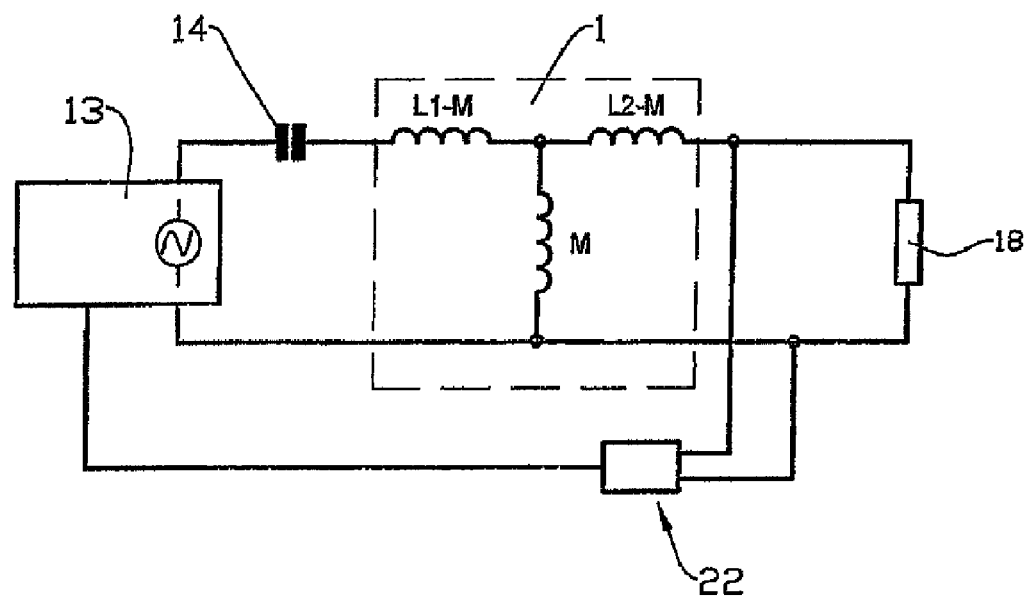
FIG. 3 is a schematic diagram for energy transmission that utilizes the leakage inductivity of the transformer.

A source of current 13, see FIG. 3, supplies the primary winding 4 of the transformer 1 with a frequency controlled voltage via a series capacitor 14 and feeder conductors 16. A load 18 is connected to the connecting conductors 20 of the secondary winding 10. A feedback loop 22 is arranged to control the frequency out of the current source 13.

Figure 4:
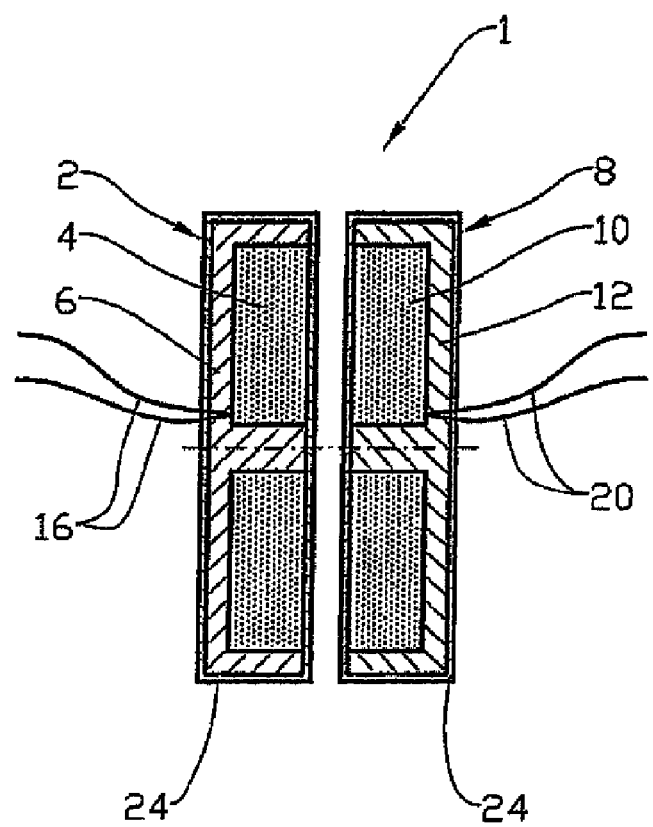
FIG. 4 is a section through a transformer.

The primary side 2 and secondary side 8 of the transformer 1 are each enclosed by a separate electrically insulating jacket 24 or similar, see FIG. 4.

Figure 5:
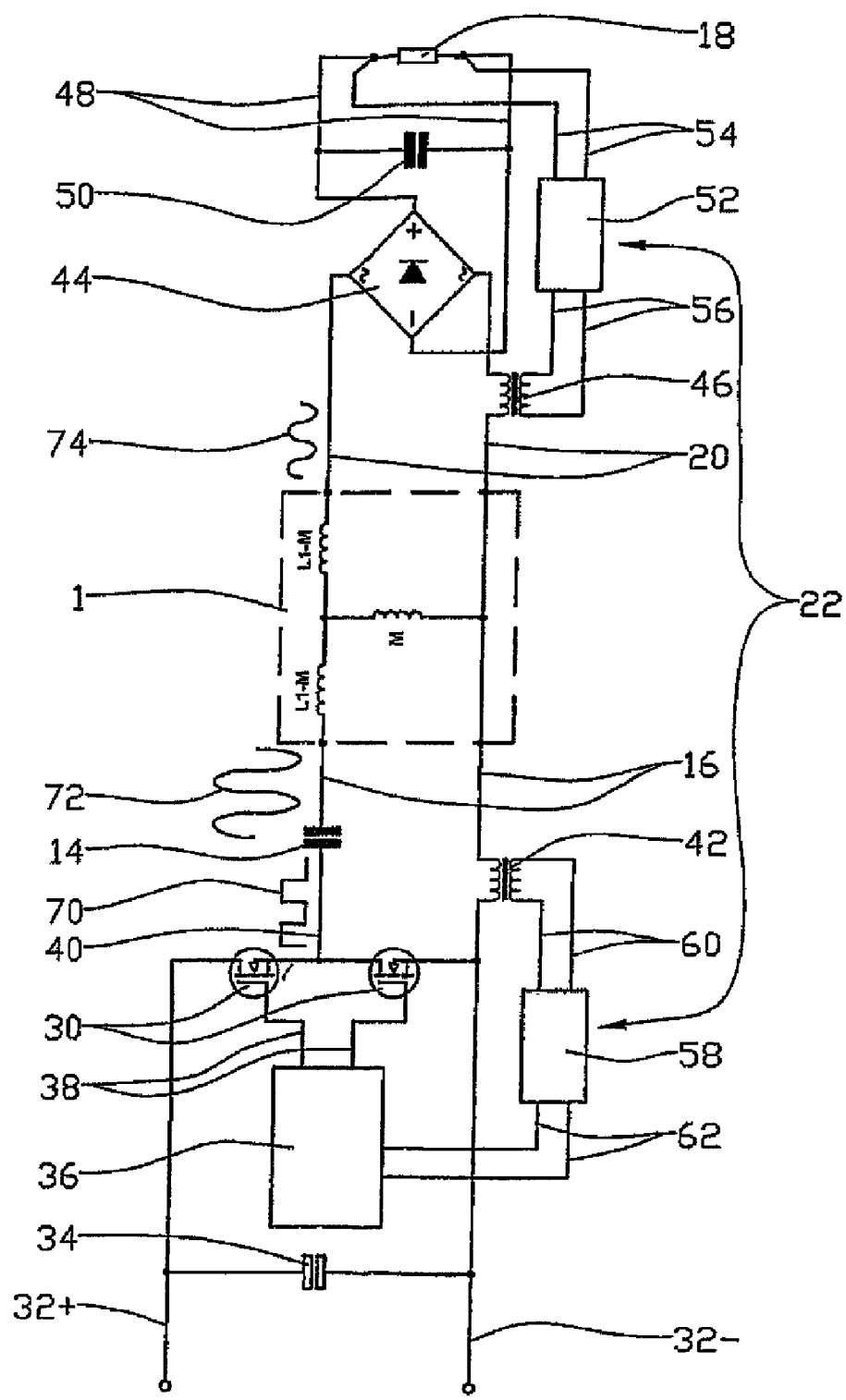
FIG. 5 is a somewhat simplified connection diagram for the energy transmission.

In the connecting diagram of FIG. 5, the device according to the invention is shown in slightly greater detail.

Two transistors 30 are connected to a source of direct current (not shown) via conductors 32+ and 32−. A first filter capacitor 34 is put in between conductors 32+ and 32−. The transistors 30 are arranged to convert input current into a square-wave signal by means of control signals from a voltage controlled oscillator 36 via conductors 38.

A conductor 40 connects the common output from the transistors 30 with the series capacitor 14. The series capacitor 14 is connected in series with the primary winding 4 of the transformer by means of one of the feeder conductors 16, while the other feeder conductor 16 is connected to the conductor 32− via a first signal transformer 42.

The connecting conductors 20 to the secondary side 8 are connected to a rectifier 44, with one of the connecting conductors 20 running via a second signal transformer 46. The load 18 is connected to the rectifier 44 by means of conductors 48. A second filter capacitor 50 is put in between the conductors 48.

An amplitude modulator 52 is connected to the conductors 48 via conductors 54 and to the second signal transformer 46 by conductors 56.

The first signal transformer 42 is connected to a demodulator 58 via conductors 60. The demodulator 58 communicates with the oscillator 36 via conductors 62.

Thus in this embodiment the feedback loop 22 comprises the amplitude modulator 52, the signal transformers 42, 46, the transformer 1 and the demodulator 58, as well as associated conductors 54, 56, 20, 16, 60 and 62.

When energy is to be transferred between the primary 2 and secondary 8 sides of the transformer 1, see FIGS. 4 and 5, a direct current is impressed on the transistors from the source of current (not shown) via the conductors 32+ and 32−. The oscillator 36 controls the transistors 30 to convert the input energy into a square-wave signal, via the conductors 38. The square-wave signal is illustrated in FIG. 5, and is denoted by reference number 70. The input energy causes a series resonant circuit to be set up between the leakage inductivity of the transformer 1 and the capacitance of the series capacitor 14.

With this the square-wave signal 70 is converted into a sine signal 72 with high amplitude. The corresponding signal in the secondary winding is denoted 74 in the drawing.

The frequency of the primary winding 4 of the transformer 1 must be matched to the series resonance circuit. Due to variations in components, changes in the gap between the core halves of the transformer, changes in input voltage and load changes, the optimum transfer of energy is ensured by adjusting the frequency of the resonant circuit by means of the feedback loop 22 from the secondary winding 10 of the transformer 1.

The voltage at the load 18 is measured and passed to the amplitude modulator 52, which transmits an amplitude modulated frequency via the second signal transformer 46, the transformer 1 and the first signal transformer 42 to the demodulator 58. The signal is filtered and demodulated to a voltage in the demodulator 58, whereupon the demodulator 58 transmits the signal onwards to the voltage-controlled oscillator 36.

The frequency is controlled from high frequency down towards the frequency of resonance. When the units are not connected or the load is small the frequency will be high. Upon an increase in load (reduction in the impedance) the frequency will decrease towards the frequency of resonance of the circuit. The adjustment from a higher frequency down towards the frequency of resonance is necessary in order to achieve a high efficiency and a relatively low EMI. As described in the general part of the specification this is due to the fact that the energy is delivered to the resonant circuit before its sine curve has reached the maximum voltage if the frequency is higher than the frequency of resonance. If the frequency is lower than the frequency of resonance the energy will be delivered with the opposite polarity relative to the voltage change ($\Delta U$) of the sine curve, whereby the efficiency is reduced.

Figure 6:
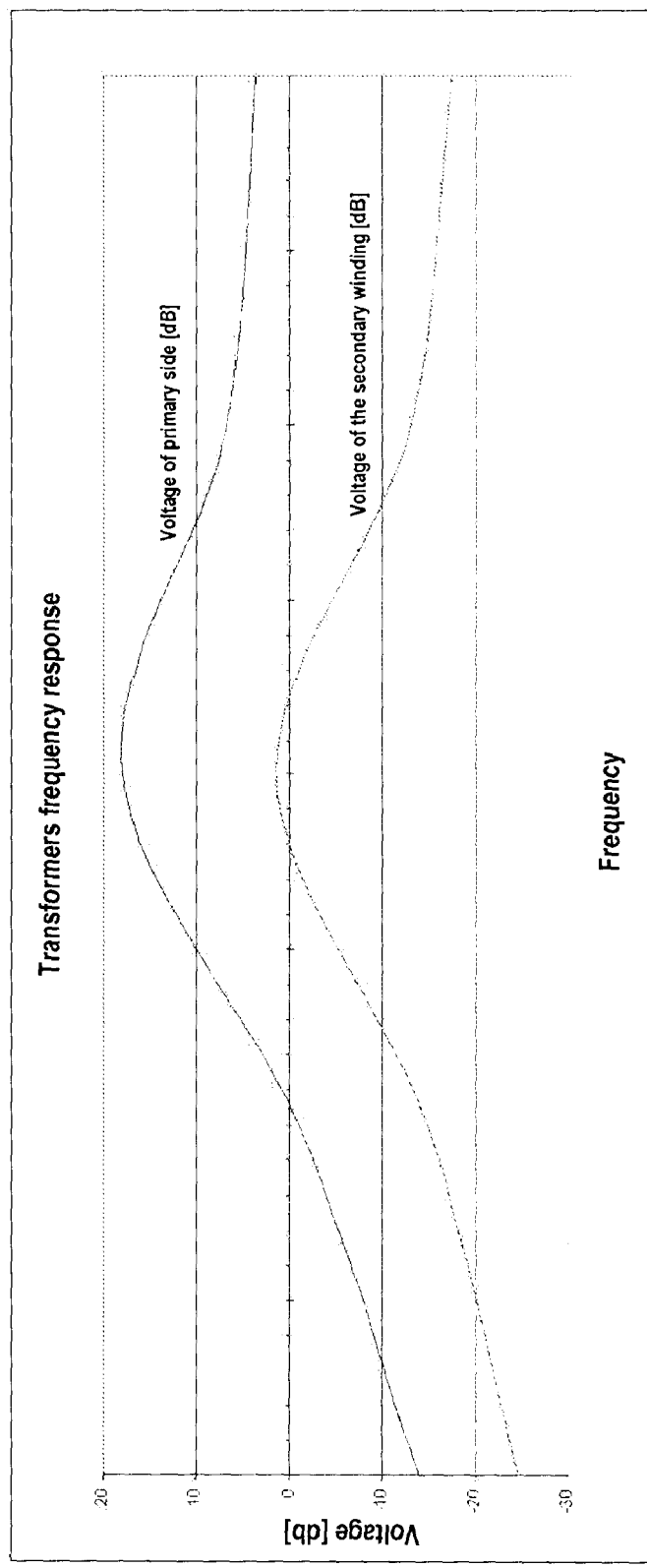
FIG. 6 is the frequency response of the resonance element.

FIG. 6 shows a transfer function for the resonant circuit. It is based on measurements at a core having a diameter of 30 mm, an air gap of 2 mm between the primary core 6 and the secondary core 12, and a series capacitor. The voltage at resonance from the secondary winding 10 is higher than the signal level into the series capacitor 14. This is a desirable situation, as it makes it possible to control a stable output voltage by varying the input voltage and the gap between primary and secondary.

Figure 7:
FIG. 7 is the voltage across the primary winding.
Figure 8:
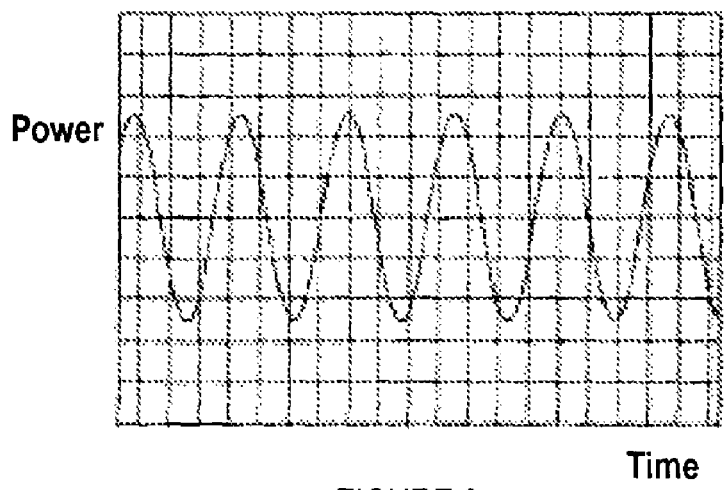
FIG. 8 is the current in the primary winding.

The voltage impressed on the resonant circuit is square-wave voltage with a 50% duty cycle. FIGS. 7 and 8 show the voltage and current measured in the primary winding. The same resonant circuit is used for this measurement as for FIG. 6. The current is an approximate sine without many superharmonic frequency components; this means that the air gap between the core halves emits little noise (EMI). Compared with sawtooth amperage, which is used in most prior art electric supplies, this embodiment will emit little EMI.

Leakage inductance normally represents a loss, but the invention causes this lost energy to be transferred to the secondary winding.

At high inductance in the transformer the leakage inductance will, with a relatively large air gap, be approximately constant when changing the distance between the core halves of the transformer. In an experiment, the core had a diameter of 30 mm, with a 2 mm gap between the cores. An increase in core gap of 33% (1 mm) reduced the inductance of the coil by approximately 13%, while the leakage inductance only increased by 1.5%. This means that the resonant circuit as a whole is not affected to any appreciable extent by this kind of increase in core gap.

The invention claimed is:

1. A transformer device comprising:
a transformer having:
at least a primary side having a primary winding and a primary core;
at least a secondary side having a secondary winding and secondary core, wherein said secondary side is separated from the primary side by an air gap for transmission of electrical energy without electrical connection, and the primary side and secondary side are electrically and mechanically unconnected; and
a capacitor connected in series with the primary winding of the transformer,
wherein the capacitor forms a resonant circuit together with a leakage inductance of the transformer,
wherein the resonant circuit is connected to a frequency controllable current source and a feedback loop from a secondary side of the transformer,
wherein the feedback loop includes the transformer and at least one first or second signal transformer in series with the transformer, and
wherein the voltage at resonance from the secondary winding is higher than the voltage of the signal level into the series capacitor.

2. A device in accordance with claim 1, wherein the frequency controllable current source is controlled by the feedback loop from a load on the secondary side of the transformer.

3. A device in accordance with claim 1, wherein the resonant circuit has a frequency impressed on it, which is higher than the frequency of resonance.

4. A method of non-contact transmission of electric energy by means of a transformer comprising at least a primary side and at least a secondary side separated from the primary side by an air gap, wherein the primary side and secondary side are electrically and mechanically unconnected, the method comprising the steps of:
setting up resonance in a circuit comprising the primary winding of the transformer and a capacitor connected in series with the primary winding, wherein the capacitor forms the resonant circuit together with a leakage inductance of the transformer,
connecting the resonant circuit to a frequency controlled source of current and a feedback loop from a secondary side of the transformer, the feedback loop including the transformer and at least one first or second signal transformer in series with the transformer,
wherein the voltage at resonance from the secondary winding is higher than the voltage of the signal level into the series capacitor.

5. A method in accordance with claim 4, wherein the resonant circuit is used as a selective filter to convert a square-wave signal into a predominantly sinusoidal signal.

6. A method in accordance with claim 4, wherein the frequency impressed on the primary winding of the transformer is controlled by the feedback loop, wherein the feedback loop communicates with the secondary side of the transformer.

* * * * *